J. T. VASEY.
FRUIT GATHERER.
APPLICATION FILED NOV. 19, 1913.
1,114,318.
Patented Oct. 20, 1914.
2 SHEETS—SHEET 2.
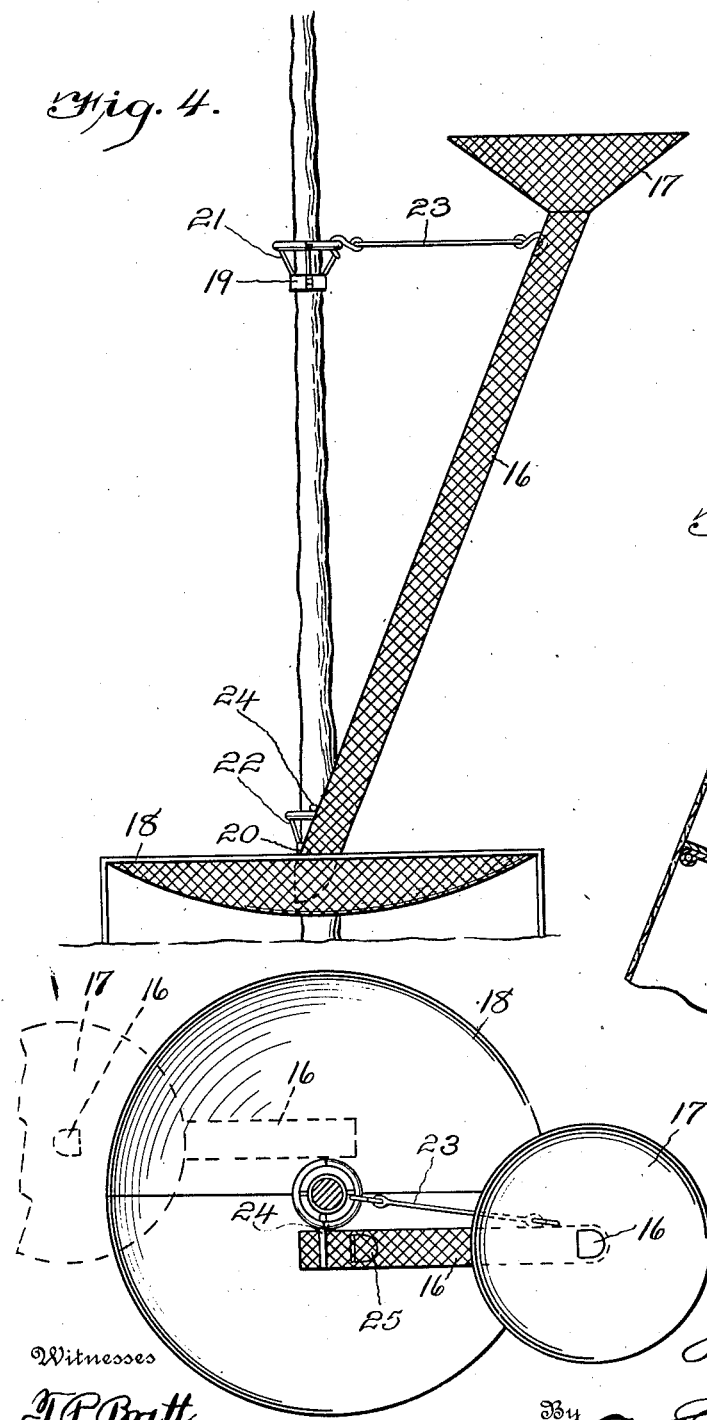
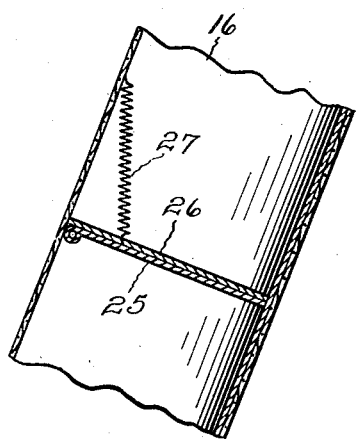
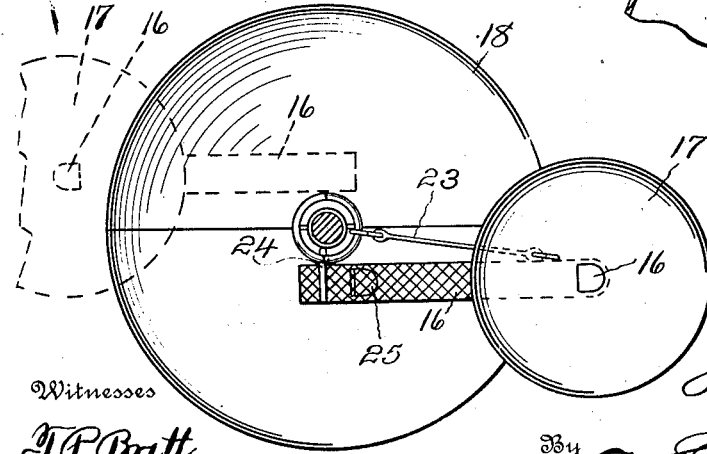
Inventor
Joseph T. Vasey
Witnesses

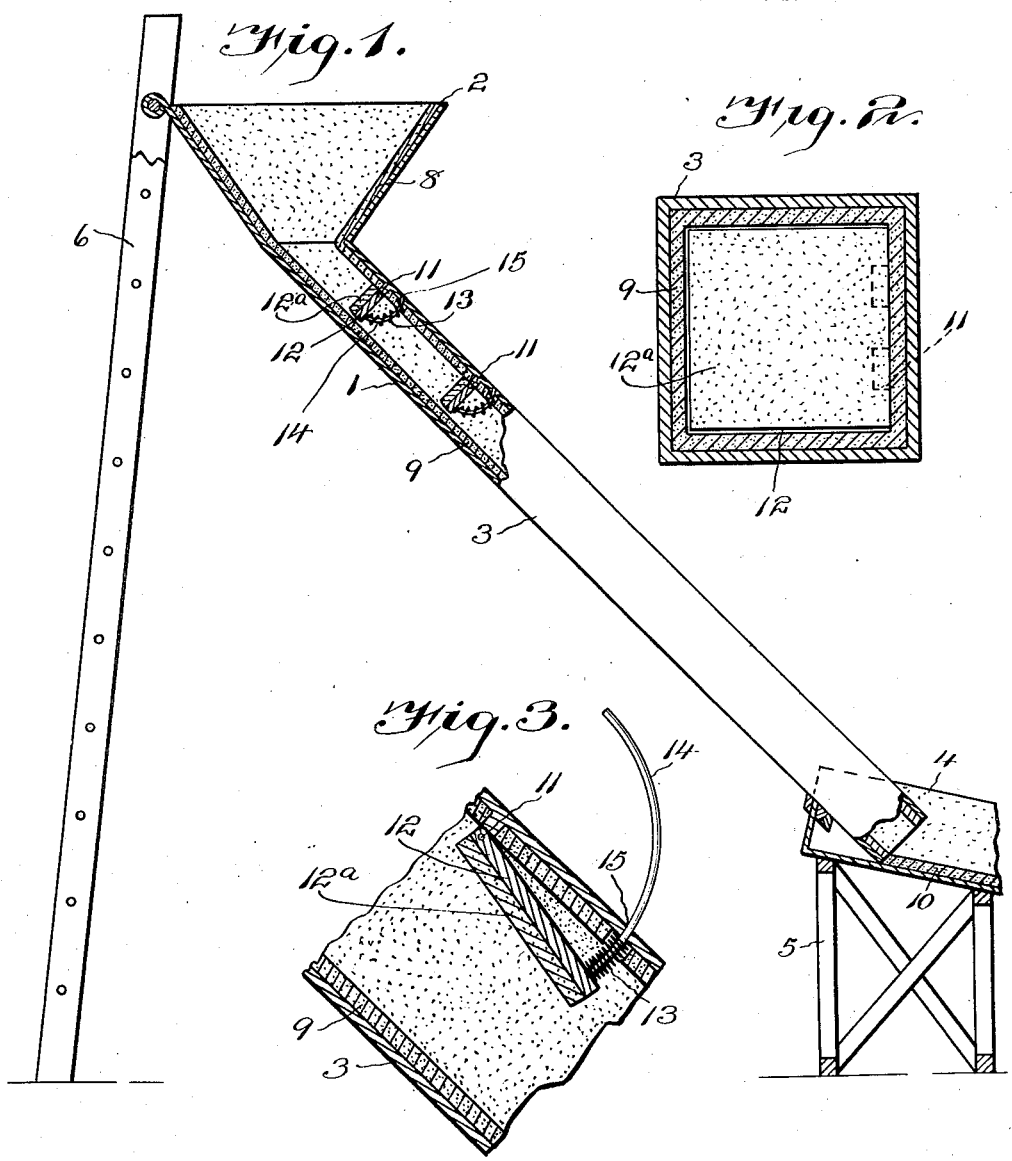

UNITED STATES PATENT OFFICE.

JOSEPH T. VASEY, OF MARSHFIELD, OREGON.

FRUIT-GATHERER.

1,114,318.   Specification of Letters Patent.   Patented Oct. 20, 1914.

Application filed November 19, 1913. Serial No. 801,892.

*To all whom it may concern:*

Be it known that I, JOSEPH T. VASEY, a citizen of the United States, residing at Marshfield, in the county of Coos and State of Oregon, have invented certain new and useful Improvements in Fruit-Gatherers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to improvements in that class of devices termed " fruit-gatherers or collectors", particularly that type including generally a chute-like contrivance adapted to be disposed with respect to the overhanging fruit-laden boughs for receiving the fruit as the latter is detached therefrom.

The invention has for its object, among other things, especially to provide against the injuring or bruising of the falling fruit.

A further object is to effect the gathering or collecting of the fruit expeditiously, conveniently and with facility.

A still further object is to provide for readily disposing the chute receiving the detached or gathered fruit conveniently to the particular point whence the fruit is being gathered from the tree as well as to provide for the ready delivery of such gathered fruit from said chute into a suitable dished receptacle.

A still further object is to provide for readily positioning the chute with respect to the gatherer or the tree, and for so attaching it to the tree as to allow ready removal of the chute after use and to render the latter highly portable.

A still further object is to carry out the aforesaid ends in a simple, effective and economical manner.

The invention therefore consists primarily of a chute rotatable or movable around the tree for disposing it with respect to the position of the gatherer.

The invention further consists of means or elements including an inflexible movable connection between the tree and the chute, said connection being such as to enable said chute to be moved around the tree trunk as may be required in suitably receiving the picked fruit.

In the accompanying drawing is illustrated the preferred embodiment of my invention wherein it will be understood that various changes and modifications as relate to the detailed construction and arrangement of the parts may be made without departing from the spirit of my invention, and in which drawing;

Figure 1 is a partly sectional and partly side elevation view of my fruit gatherer, parts being broken away. Fig. 2 is a transverse section taken through the tubular portion of the chute. Fig. 3 is a fragmental sectional view produced longitudinally of the chute or rather its tubular member, showing more fully one of the fruit-engaged valves with its controlling spring. Fig. 4 is a modification of my invention as applied for use to the trunk of a tree. Fig. 5 is a plan view of the device as disclosed by Fig. 1, the tree-trunk being shown in section, and the chute being also shown in dotted lines, swung diametrically opposite the position indicated in full lines. Fig. 6 is a fragmental sectional view of the chute-tube showing more especially a valve thereof.

In the disclosure of my invention, I suitably contrive or construct a chute designated generally by the reference character 1, the same including an upper-end hopper 2 and a tube 3 suitably secured or connected at its upper end to the lower tapered portion of the hopper and into which tube the hopper delivers, the tube itself discharging into a trough-like receptacle 4. The receptacle 4 is supported in any suitable way, preferably upon framed-together or trestle-like legs 5, this receptacle providing for the final reception and temporary retention of the gathered fruit for suitable removal. The chute 3 is suitably supported in operative position, the hopper 2, at that end, being connected at its upper rear edge as shown to a rung of a preferably forwardly inclined support 6 or it may be otherwise connected to said rung which support may be an improvised ladder and which ladder may be propped at its lower end against the base of the tree from which the fruit is being gathered, the opposite edge of the chute, or its hopper being held thereby against a limb of the tree, and upon which ladder the attendant may stand for greater convenience in effecting the detaching of the fruit from the tree, as will be readily appreciated.

The chute, including its hopper 2 and tube 3, together with the receptacle 4, have all their walls suitably lined or padded as at 8, 9 and 10 respectively, to greatly lessen the tendency of the damaging of the fruit as would otherwise result if the latter contacted directly with the walls of these parts in their descent therethrough, the padding being applied to said parts about an inch in thickness or depth.

Within the tube member of the chute are suitably pivoted or hung as at 11, from the inner surface of the upper wall thereof, valves 12 also similarly padded as at 12ª and for the like purpose, and of an area to serve for closing the interior of said tube cross-sectionally, said valves being held suitably in closed position by the action of springs 13 encompassing quadrant like members 14 which may be of stout wire and secured to said valves and extending freely through apertures 15 in said upper wall of the tube 3 of the chute, said springs being compressed as the valves are engaged or opened, and accordingly delivering suitable pressure upon the valves as they are opened, to cause them to have an automatic closing action. It will therefore be apparent that as the detached or severed fruit drops from the tree into the chute-hopper and into the tubular portion of the chute it will be intercepted or interrupted at suitable intervals by the padded valves in its descent and its movement thus be retarded, which with the padded walls of said hopper and tubular portion will all serve to guard the fruit against forcibly contacting with said walls and said valves and accordingly prevent its becoming damaged as otherwise would be the case. Of course the padded walls of the receptacle receiving the fruit from the chute will provide against the fruit being damaged thereby at this point, the fruit thus being protected in its passage throughout from point of reception to point of delivery; the retarding action of the valves in the chute also being automatic results in carrying out the objects of the invention in simple, expeditious and effective manner.

In the modification of my invention, as suggested by Figs. 4, 5 and 6, I provide a tube 16 which may, together with its hopper 17, be of wire woven fabric for lightness and yet have the requisite stability for its intended purpose, and which tube delivers at its lower end centrally into a dished bisected receptacle 18 also preferably of wire woven fabric and which may correspond to the receptacle 4 as above described, the receptacle 18 however being disposed around the trunk of the tree at its base; this being called for as is apparent by reason of the arrangement of the discharging end of the tube 16.

As above incidentally suggested, the tube 16, which is disposed in an inclined position, is movably connected to the trunk of the tree at its upper divergent end and at its lower convergent end, the connections each including a bisected band 19 and 20, respectively, fitted around the trunk of the tree, the sections of each band being articulated together and connected by a clasp (not shown). Each band also has an upwardly extending cage-like portion 21 and 22, respectively, also encompassing the tree trunk, to the upper member of the upper one of which cage-like sections is suitably and freely jointed one end of an inflexible member 23, the opposite end of the latter being similarly connected to the upper portion of the tube 16. To the lower cage-like portion 22 is pivotally connected as at 24 the lower end of the tube so that, in connection with the upper end connection 23, the tube 16 may be moved around to the point whence the fruit is being gathered from the tree in order that the fruit may be suitably received within the hopper for delivery into the dished receptacle through the tube as will be readily appreciated.

The tube 16, together with its pivoted valves 25, is suitably padded as at 26 as the corresponding parts and for the same purpose as those above described, the valves being also similarly resiliently held as at 27 and for like purposes as indicated.

Having thus described the invention what I claim as new and desire to secure by Letters Patent is:—

1. A fruit-gatherer of the type described, including a chute having a tubular body, annular members adapted for application to the trunk of a tree near the ground and at a point near the tree branches, respectively, said annular members having offset corresponding members, and inflexible connections between the latter members and the upper and lower ends of said tubular body, respectively.

2. A fruit-gatherer of the type described, including a chute having a tubular body, a dished receptacle applied to the trunk of a tree at the ground, said chute having its tubular body delivering into said dished receptacle, annular members applied to said tree-trunk, within said dished receptacle, and at a point contiguous to the tree-branches, respectively, said annular members having offset corresponding members and rod-connections between the latter members and said tubular body at its upper and lower ends, respectively.

In testimony whereof, I affix my signature, in presence of two witnesses.

JOSEPH T. VASEY.

Witnesses:
E. DON McCRARY, Jr.,
E. W. KAMMERER.